United States Patent
Kim et al.

(10) Patent No.: US 8,265,922 B2
(45) Date of Patent: Sep. 11, 2012

(54) METHOD AND APPARATUS FOR APPLYING TRANSLATION MEMORY IN AUTOMATIC TRANSLATION SYSTEM

(75) Inventors: Chang Hyun Kim, Daejeon (KR); Oh Woog Kwon, Daejeon (KR); Yoon Hyung Roh, Daejeon (KR); Young Ae Seo, Daejeon (KR); Seong Il Yang, Daejeon (KR); Ki Young Lee, Daejeon (KR); Sung Kwon Choi, Daejeon (KR); Yun Jin, Daejeon (KR); Eun Jin Park, Daejeon (KR); Ying Shun Wu, Daejeon (KR); Changhao Yin, Daejeon (KR); Jinxia Huang, Daejeon (KR); Young Kil Kim, Daejeon (KR); Sang Kyu Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 470 days.

(21) Appl. No.: 12/603,680

(22) Filed: Oct. 22, 2009

(65) Prior Publication Data
US 2010/0138214 A1 Jun. 3, 2010

(30) Foreign Application Priority Data

Dec. 2, 2008 (KR) .................. 10-2008-0121023
Mar. 27, 2009 (KR) .................. 10-2009-0026452

(51) Int. Cl.
*G06F 17/28* (2006.01)
(52) U.S. Cl. ........................................... 704/2
(58) Field of Classification Search ............. 704/1–10
See application file for complete search history.

(56) References Cited

U.S. PATENT DOCUMENTS

| | | | | |
|---|---|---|---|---|
| 2002/0138250 | A1* | 9/2002 | Okura et al. | 704/2 |
| 2003/0125928 | A1* | 7/2003 | Lee et al. | 704/4 |
| 2008/0162115 | A1* | 7/2008 | Fuji et al. | 704/7 |
| 2008/0249760 | A1* | 10/2008 | Marcu et al. | 704/2 |
| 2010/0070261 | A1* | 3/2010 | Jin et al. | 704/2 |

FOREIGN PATENT DOCUMENTS

| | | |
|---|---|---|
| KR | 10-2001-0081770 | 8/2001 |
| KR | 10-2003-0068502 | 8/2003 |
| KR | 10-2004-0050394 | 6/2004 |
| KR | 10-2006-0067116 | 6/2006 |

OTHER PUBLICATIONS

"Feasibility Test and Design of Korean Translation Memory System," Cheol Ryu et al., Korea Institute of Science and Technology Information, vol. 2001, No. 10, pp. 281-287, 2001.
Kim Jung-In, "Japanese Korean Machine Translation System Using Connection Forms of Neighboring Words", Journal of Korea Multimedia Society, vol. 7, No. 7, Jul. 2004, pp. 998-1008.

* cited by examiner

*Primary Examiner* — Abul Azad
(74) *Attorney, Agent, or Firm* — Staas & Halsey LLP

(57) ABSTRACT

A translation-memory application method for automatic translation includes: generating TM-expanded forms by applying TM expansion rules respectively to source sentences whose morphemes have been analyzed; storing in an expanded TM database translated sentences corresponding to the generated TM-expanded source sentences; analyzing morphemes if an input sentence does not match any of the source sentences stored in basic TM database; generating a TM-expanded form by applying pertinent ones among the TM expansion rules to the input sentence whose morphemes have been analyzed; and producing, if the TM-expanded input sentence matches one of the TM-expanded source sentences stored in the expanded TM database, a translated output corresponding to the matched TM-expanded source sentence.

20 Claims, 3 Drawing Sheets

METHOD AND APPARATUS FOR APPLYING TRANSLATION MEMORY IN AUTOMATIC TRANSLATION SYSTEM

CROSS-REFERENCE(S) TO RELATED APPLICATION(S)

The present invention claims priority of Korean Patent Applications No. 10-2008-0121023, filed on Dec. 2, 2008, and No. 10-2009-0026452, filed on Mar. 27, 2009, which are incorporated herein by reference.

FIELD OF THE INVENTION

The present invention relates to a method and apparatus for applying translation memory in an automatic translation system, and, in particular, to a method and apparatus that, in a Korean-English or Korean-Chinese translation, store in an expanded translation memory database source sentences expanded by analyzing its morphemes and applying the translation memory expansion and translated sentences that correspond to the expanded source sentences and then carry out an automatic translation by matching with the expanded source sentences an input sentence expanded by analyzing its morphemes and applying the translation memory expansion.

BACKGROUND OF THE INVENTION

There have been a great deal of efforts to translate a document automatically on a machine since 1940s with the advent of the computer. Machine-translation systems of early days such as Georgetown Automatic Translation (also known as GAT) and Traduction Automatique à l'Université de Montréal (also known as TAUM) are regarded as pioneers in this field but their translation quality fell badly short of the industry's expectations.

With the recent rapid development of computer capabilities and the increasing need to resolve the information blockage due to language barriers, however, research works in artificial intelligence and computational linguistics have made significant progresses, giving rise to the modern development of machine translation. In a machine-translation system, the method applying translation memory plays the central role.

There are two types of applying translation memory in a machine-translation system: exact match and approximate match. If the first type is employed, a translated sentence may be produced only when there is an exact match between the input sentence and the translation memory. In this case, the quality of translated sentence is expected to be high. If the second type is employed, a translated sentence may be produced in spite of an inexact match with the translation memory, if it is regarded as being sufficiently close to the translation memory based on the degree of approximation.

SUMMARY OF THE INVENTION

If a machine translation system of the first type is employed, i.e., a translated sentence is produced only when there is a perfect match between the input sentence that needs translation and the translation memory, the success of translation depends largely on how many sentences used in the corresponding domain are contained in the translation memory. In case of an agglutinative language such as Korean, the domain coverage of the translation memory gets significantly diminished due to factors like elision, word order, variety of particles, endings and expressions.

If a machine translation system of the second type is employed, i.e., a translated sentence may be produced in spite of an approximate match with the translation memory, additional works are called for in order to produce the final output. That is, the approximately matched parts of the sentence need additional human intervention and the mismatched parts are subject to an additional automatic translation. While the requirement of additional human intervention reduces a great deal of merits in automatic translation, the additional automatic translation of the mismatched parts leads to deterioration in the translation quality.

In view of the above, the present invention provides a method and an apparatus for applying translation memory (hereinafter, referred to as TM) in an automatic translation system that stores in an expanded TM database a source sentence expanded by analyzing its morphemes and applying the TM expansion and a translated sentence that corresponds to the expanded source sentence and then carries out an automatic translation by matching with the expanded source sentence an input sentence expanded by analyzing its morphemes and applying the TM expansion.

In accordance with a first aspect of the present invention, there is provided a method for applying TM in an automatic translation system, including:

generating TM-expanded forms by applying TM expansion rules respectively to source sentences whose morphemes have been analyzed;

storing in an expanded TM database translated sentences corresponding to the generated TM-expanded source sentences;

analyzing morphemes if an input sentence does not match any of the source sentences stored in basic TM database;

generating a TM-expanded form by applying pertinent ones among the TM expansion rules to the input sentence whose morphemes have been analyzed; and producing, if the TM-expanded input sentence matches one of the TM-expanded source sentences stored in the expanded TM database, a translated output corresponding to the matched TM-expanded source sentence.

In accordance with a second aspect of the present invention, there is provided an apparatus for applying TM in an automatic translation system, including:

a basic TM match unit that matches an input sentence with source sentences stored in a basic TM database;

a morphemic analyzer that analyzes morphemes of the input sentence if the basic match yields a mismatch;

an expansion unit that generates a TM-expanded form by applying pertinent ones among TM expansion rules to the input sentence whose morphemes have been analyzed; and an expanded TM match unit that produces a translated output corresponding to the matched expanded source sentence if the generated TM-expanded input sentence matches one of expanded source sentences stored in an expanded TM database.

The present invention provides a method and an apparatus for applying TM in an automatic translation system that stores in an expanded TM database a source sentence expanded by analyzing its morphemes and applying the TM expansion and a translated sentence that corresponds to the expanded source sentence and then carries out an automatic translation by matching with the expanded source sentence an input sentence expanded by analyzing its morphemes and applying the TM expansion so that the TM coverage can be extended by using the TM sentence of the same size without having to construct additional TM.

Besides, by the method and apparatus for applying TM in an automatic translation system of the present invention, the single most important requirement of an automatic translation system that the translation quality be enhanced can be fulfilled.

BRIEF DESCRIPTION OF THE DRAWINGS

The above features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art. Furthermore, if, in the following description of the present invention, detailed descriptions of well-known functions or constructions may unnecessarily make the gist of the present invention obscure, such detailed descriptions will be omitted.

Figure 1:
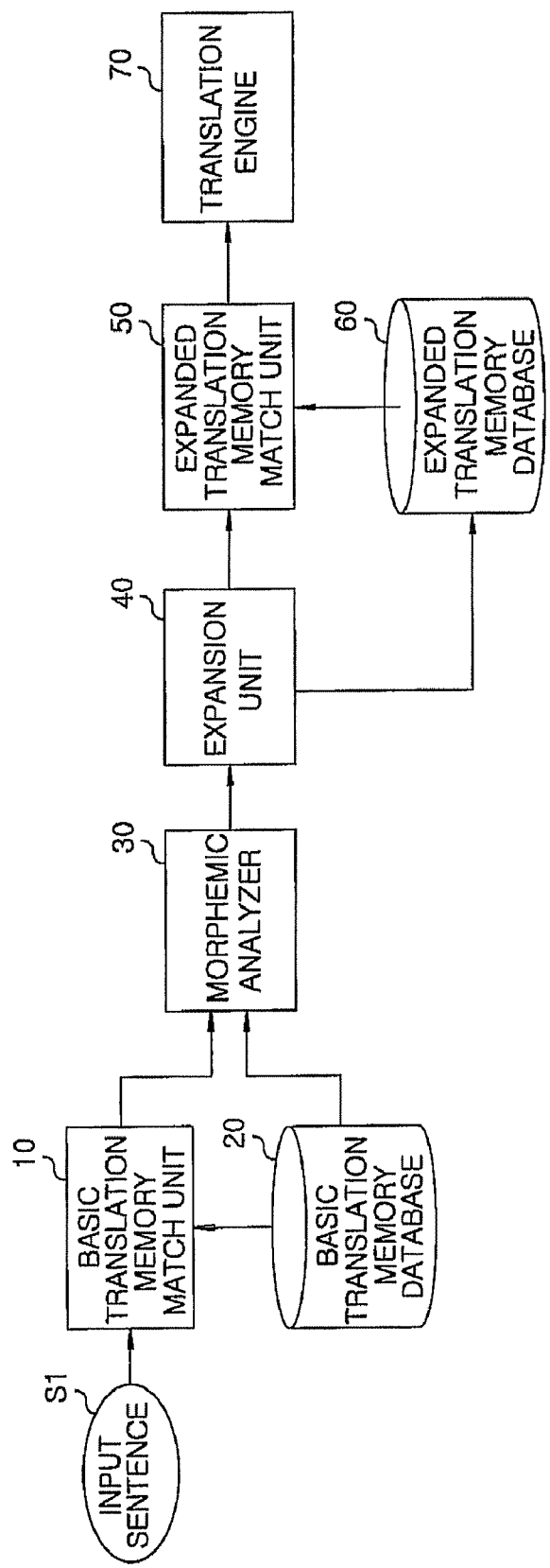
FIG. 1 shows a block diagram of an apparatus for applying translation memory in an automatic translation system in accordance with an embodiment of the present invention.

FIG. 1 shows a block diagram of an apparatus for applying translation memory in an automatic translation system in accordance with an embodiment of the present invention. The apparatus includes a basic translation-memory match unit 10, a basic translation-memory database 20, a morphemic analyzer 30, an expansion unit 40, an expanded translation-memory match unit 50, an expanded translation-memory database 60 and a translation engine 70. Hereinafter, translation memory (or translation-memory) shall be referred to as TM for the sake of brevity.

The basic TM match unit 10 identifies spaces and symbols in an input sentence S1 and compares the input sentence with respective source sentences stored in the basic TM database 20. If the comparison yields an exact match as the same sentence, the translated result corresponding to a source sentence that matches the input sentence is read in to produce the output and the translation is finished. If the comparison does not give an exact match, however, the input sentence is passed to the morphemic analyzer 30.

The basic TM database 20 keeps a number of source sentences and an equal number of translated sentences corresponding to them.

The morphemic analyzer 30 analyzes morphemes of the input sentence passed from the basic TM match unit 10 and sends the result to the expansion unit 40. Besides, the morphemic analyzer 30 reads in a source sentence held in the basic TM database 20 as well as its translated sentence and then analyzes morphemes of the source sentence to send the result to the expansion unit 40.

Figure 2:
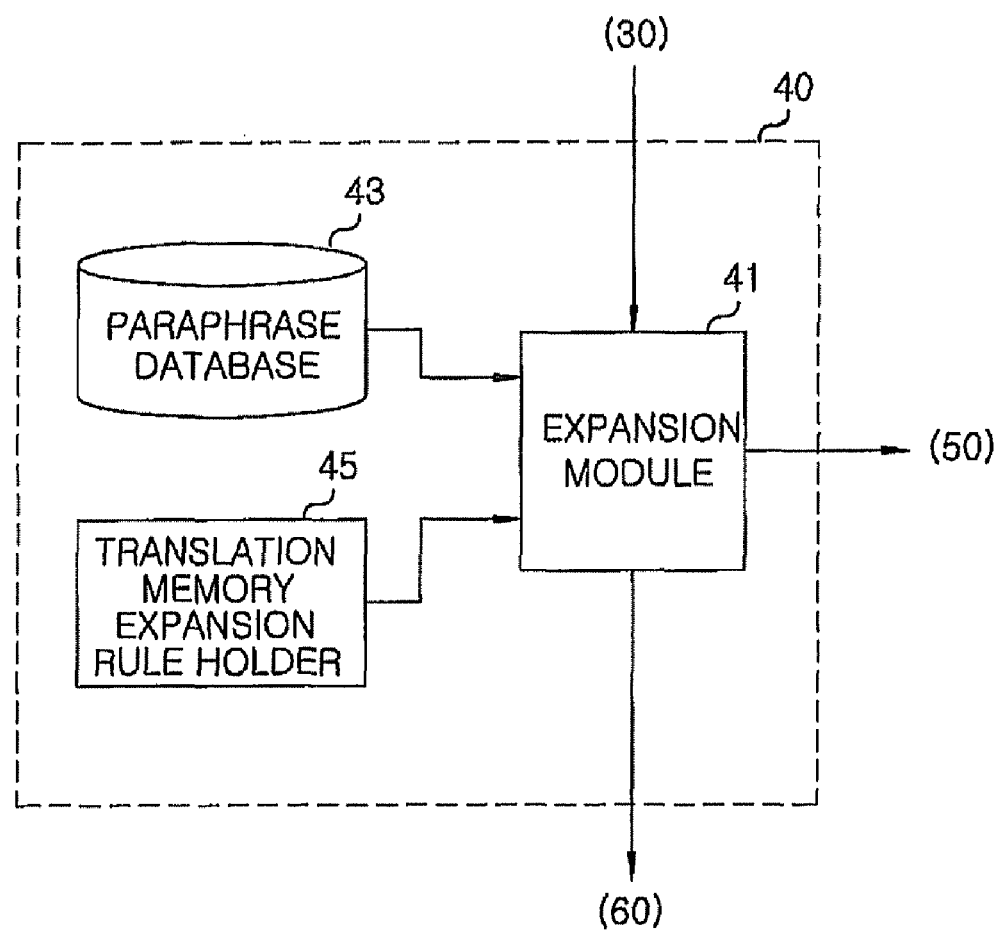
FIG. 2 depicts a detailed block diagram of the expansion unit shown in FIG. 1.

The expansion unit 40 includes an expansion module 41, a paraphrase database 43 and a TM expansion-rule holder 45 as illustrated in the detailed block diagram of FIG. 2.

The expansion module 41 generates a TM-expanded form of the input sentence by applying pertinent ones among the five expansion rules held in the TM expansion-rule holder 45 to the input sentence sent by the morphemic analyzer 30 and then passes the generated TM-expanded form to the expanded TM match unit 50. Here, the five TM expansion rules includes those rules reflecting an ellipsis, inflection, free word order, paraphrase with various expressions and characteristics of a sentence-initial word.

Furthermore, the expansion module 41 generates a TM-expanded form of the source sentences by applying pertinent ones among the five expansion rules held in the TM expansion-rule holder 45 to the source sentences sent by the morphemic analyzer 30 and then passes the TM-expanded source sentences as well as their corresponding translations to the expanded TM database 60.

The paraphrase database 43 keeps paraphrase data for them to be available for the expansion module 41 to apply the TM expansion rule that reflects paraphrase with various expressions.

The TM expansion-rule holder 45 holds the five TM expansion rules, i.e. the rules that reflect an ellipsis, inflection, free word order, paraphrase with various expressions and characteristics of a sentence-initial word.

The expanded TM match unit 50 compares the TM-expanded input sentence passed from the expansion module 41 in the expansion unit 40 with the expanded source sentences stored in the expanded TM database 60, respectively. If the comparison yields an exact match as the same sentence, the translated result corresponding to an expanded source sentence that matches the input sentence is read in to produce the output and the translation is finished. If the comparison does not give an exact match, however, the input sentence is passed to the translation engine 70.

The expanded TM database 60 keeps the TM-expanded source sentences that have been obtained by expanding the source sentence input from the expansion unit 40 as well as their corresponding translations.

The translation engine 70 is a conventional automatic translator. It produces an automatically translated output for the input sentence passed from the expanded TM match unit 50.

Therefore, the present invention stores in the expanded TM database a source sentence expanded by analyzing its morphemes and applying the TM expansion and a translated sentence that corresponds to the expanded source sentence and then carries out an automatic translation by matching with the expanded source sentence an input sentence expanded by analyzing its morphemes and applying the TM expansion so that the translation memory coverage can be extended by using the translation memory sentence of the same size without having to construct additional translation memory.

Figure 3:
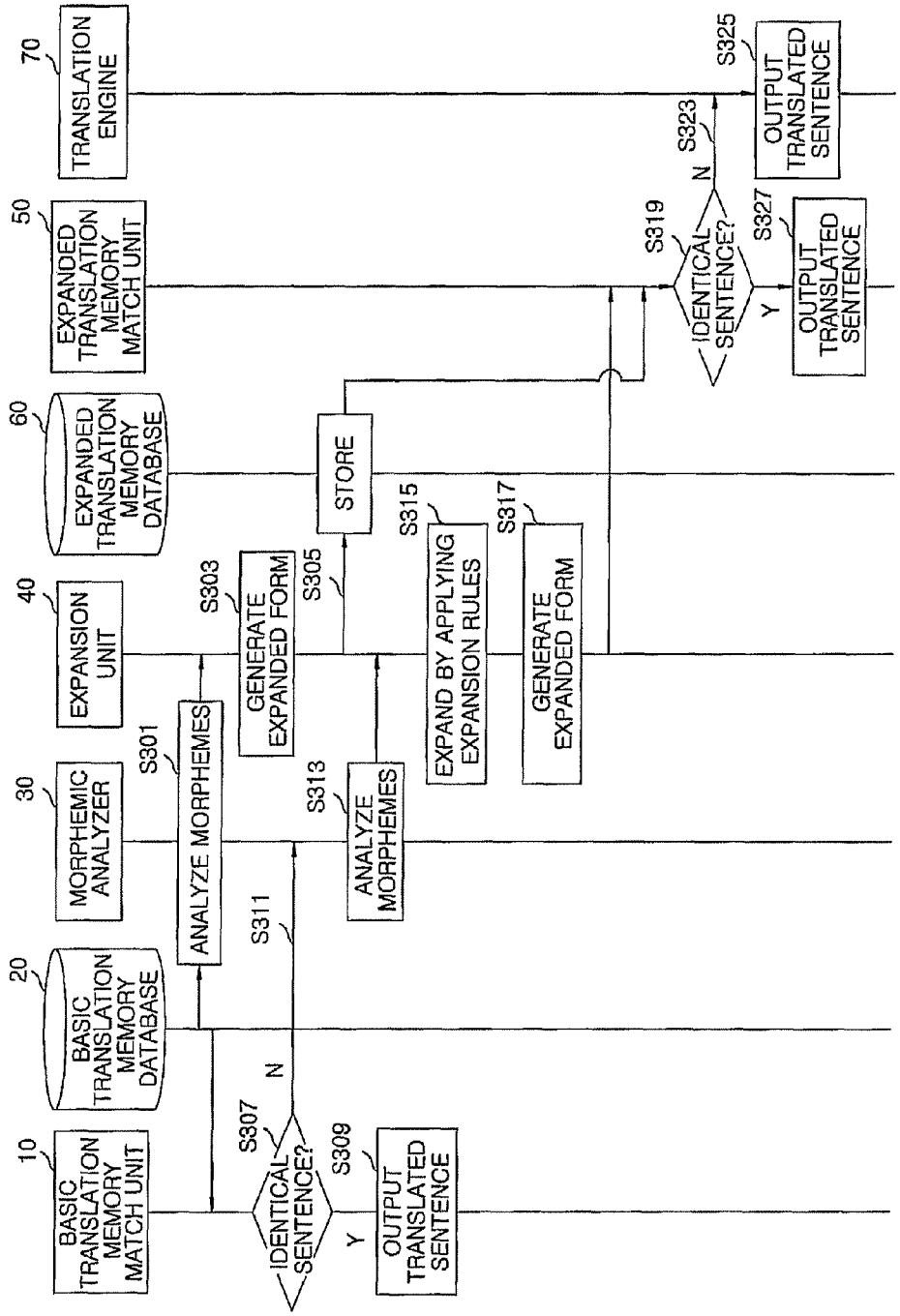
FIG. 3 illustrates a flowchart of how translation memory is applied in an automatic translation system in accordance with an embodiment of the present invention.

In what follows, an explanation is given to show how translation memory is applied in an automatic translation system in accordance with an embodiment of the present invention. FIG. 3 illustrates a flowchart of the sequence of the corresponding steps.

The morphemic analyzer 30 reads in a source sentence held in the basic TM database 20 as well as its translated sentence and then analyzes morphemes of the source sentence, at step S301, to send the result to the expansion unit 40.

At step S303, the expansion module 41 in the expansion unit 40 applies the five TM expansion rules held in the TM expansion-rule holder 45 to the source sentence whose morphemes have been analyzed by the morphemic analyzer 30 in order to expand the source sentence and generate its TM-expanded form. A detailed account of the five expansion rules and the respective expansion procedure is given below with select examples.

(1) The TM expansion reflecting ellipsis is to generate a form in which particles are omitted. For example,
1. Source sentence: 저녁은 먹었니?
2. Morphemic analysis:

| 저녁 | 은 | | 먹 | 었 | 니 | ? |
|---|---|---|---|---|---|---|
| noun | AUX PRTCL | SP | verb | PREF END | FIN END | SYM |

3. Expanded TM: 저녁은 먹었니?
Hereinafter, AUX PRTCL, SP, PREF END, FIN END and SYM denote auxiliary particle, space, prefinal ending, final ending and symbol, respectively.

Note that the result of a morphemic analysis indicates that 은 in the clause 저녁은 is an auxiliary particle. In an expanded form that reflects ellipsis of particles, this auxiliary particle is omitted and, hence, the TM-expanded form of a TM, 저녁 먹었니?, is generated.

(2) The TM expansion reflecting inflection is to register an interrogative form in lieu of individual endings to treat them as an identical TM. For example,
1. Source sentences: 방에 TV가 있나요?
   방에 TV가 있어요?
   방에 TV가 있습니까?
2. Morphemic analysis:

| 방 | 에 | | TV | 가 | | 있 | 나요 | ? |
| 방 | 에 | | TV | 가 | | 있 | 어요 | ? |
| 방 | 에 | | TV | 가 | | 있 | 습니까 | ? |
|---|---|---|---|---|---|---|---|---|
| noun | ADV PRTCL | SP | noun | NOM PRTCL | SP | ADJ | INT END | SYM |

3. Expanded TM: 방에 TV가 있- interrogative form Hereinafter, ADV PRTCL, NOM PRTCL, ADJ and INT END denote adverbial particle, nominal particle, adjective and interrogative ending, respectively.

Note that the result of a morphemic analysis indicates that the three endings, 나요?, 어요? and 습니까?, are of interrogative form. Hence, by registering only their common information, the interrogative form in the present example, in lieu of three individual endings, the individual sentences that would be recognized otherwise as three different sentences are treated as an identical TM, yielding the TM-expanded form of a TM, 방에 TV가 있- interrogative form.

(3) The TM expansion reflecting free word order is to generate an expanded TM by recomposing a sentence in clauses by a criterion independent of word order. For example,
1. Input sentences: 누구에게 질문을 하나요? 질문을 누구에게 하나요?
2. Expanded TM 누구에게 질문을 하나요?
In order to resolve the problem of diminution of coverage due to word order, clauses in the sentences are arranged and the expanded TM is generated as one entry from the arranged clauses. In the present example, 누구에게 질문을 하나요? is an entry to be input for the expanded TM.

(4) The TM expansion reflecting paraphrase with various expressions is to generate an expanded TM by using paraphrase data stored in the paraphrase database shown in FIG. 2. Morphemes of the input sentence are analyzed and the corresponding paraphrase data are examined to see if they can be applied for the TM expansion. For example,
1. Input sentence: 어디에 짐을 맡길 수 있나요?
2. Morphemic analysis:

| 어디 | 이 | | 짐 | 을 | | 맡기 | ㄹ | 수 | | 있 | 나요 | ? |
|---|---|---|---|---|---|---|---|---|---|---|---|---|
| INT PRN | ADV PRTCL | SP | noun | OBJ PRTCL | SP | verb | ADN END | Bound noun | SP | ADJ | INT END | SYM |

3. Paraphrase data

| 짐 | 을 | | 맡기 | ㄹ | 수 |
| 짐 | 을 | | 보관하 | ㄹ | 것 |
|---|---|---|---|---|---|
| noun | OBJ PRTCL | SP | verb | ADN END | Bound noun |

4. Expanded TM: 이 짐을 보관해 주세요.
Hereinafter, INT PRN, ADV PRTCL, OBJ PRTCL and ADN END denote interrogative pronoun, adverbial particle, objective particle and adnominal ending, respectively.

Paraphrase data can be any of a word, a clause or a sentence. In the present example, 짐을 맡기!다 can be paraphrased to 짐을 보관하다 so that 이 짐을 보관해주세요. is generated for the TM-expanded form.

(5) The TM expansion reflecting characteristics of a sentence-initial word is to generate an expanded TM based on the type of a sentence-initial word and morphemic analysis of the sentence. For example,
1. Input sentence: 어서 빨리 서두르자. 와, 정말 예쁘다.
2. Morphemic analysis

| 어서 | | 빨리 | | 서두르 | 자 | . |
|---|---|---|---|---|---|---|
| ADV | SP | ADV | SP | verb | IMP END | SYM |

| 와 | , | | 정말 | | 예쁘 | 다 | . |
|---|---|---|---|---|---|---|---|
| ADV | SYM | SP | ADV | SP | ADJ | FIN END | SYM |

3. Expanded TM: 빨리 서두르자. 정말 예쁘다.
Here, ADV and IMP END denote adverb and final ending, respectively.

When a sentence-initial word is an adverb, interjection or vocative, it is eliminated in the expanded TM. In this case, unlike in the four preceding expansions, a translator is used to translate the sentence-initial word and then the translated result is combined with the translation of the expanded TM to yield a TM-expanded form.

A number of source sentences stored in the basic TM 20 are all expanded by the five rules at step S303. At step S305, TM-expanded forms of a source sentence and the translations of these expanded source sentences are stored in the expanded TM database 60.

At step S307, the basic TM match unit 10 identifies spaces and symbols in an input sentence S1 and compares the input sentence with respective source sentences stored in the basic TM database 20 to see if they match as the same sentence.

At step S309, if the comparison at step S307 yields an exact match as the same sentence, the translated result corresponding to a source sentence that matches the input sentence is read in to produce the output and the translation is finished.

At step S311, if the comparison does not give an exact match, however, the input sentence is passed to the morphemic analyzer 30.

At step S313, the morphemic analyzer 30 analyzes morphemes of the input sentence passed from the basic TM match unit 10 and sends the result to the expansion unit 40.

At step S315, the expansion module 41 generates a TM-expanded form of the input sentence by applying pertinent ones among the five expansion rules held in the TM expansion-rule holder 45 to the input sentence sent by the morphemic analyzer 30. At step S317, the generated TM-expanded form is passed to the expanded TM match unit 50.

At step S319, the expanded TM match unit 50 compares the TM-expanded input sentence passed from the expansion module 41 in the expansion unit 40 with the expanded source sentences stored in the expanded TM database 60, respectively.

If the comparison at step S319 does not give an exact match, the input sentence is passed to the translation engine 70, step S323. The translation engine 70 produces an automatically translated output for the input sentence passed from the expanded TM match unit 50, at step S325.

If the comparison at step S319 yields an exact match as the same sentence, however, the translated result corresponding to an expanded source sentence that matches the input sentence is read in to produce the output and the translation is finished at step S327.

It has been shown in embodiments of the present invention that, by the method and apparatus for applying translation memory in an automatic translation system of the present invention, the single most important requirement of an automatic translation system that the translation quality be enhanced can be fulfilled.

While the invention has been shown and described with respect to the embodiments, it will be understood by those skilled in the art that various changes and modifications may be made without departing from the scope of the invention as defined in the following claims.

What is claimed is:

1. A translation-memory (hereinafter, referred to as TM) application method for automatic translation, comprising:
   generating TM-expanded forms by applying TM expansion rules respectively to source sentences whose morphemes have been analyzed;
   storing in an expanded TM database translated sentences corresponding to said generated TM-expanded source sentences;
   analyzing morphemes if an input sentence does not match any of said source sentences stored in basic TM database;
   generating a TM-expanded form by applying pertinent ones among said TM expansion rules to said input sentence whose morphemes have been analyzed; and
   producing, if said TM-expanded input sentence matches one of said TM-expanded source sentences stored in said expanded TM database, a translated output corresponding to said matched TM-expanded source sentence.

2. The TM application method for automatic translation of claim 1, wherein said TM expansion rules further include:
   a TM expansion rule reflecting ellipsis;
   a TM expansion rule reflecting inflection;
   a TM expansion rule reflecting free word order;
   a TM expansion rule reflecting paraphrase with various expressions; and
   a TM expansion rule reflecting characteristics of a sentence-initial word.

3. The TM application method for automatic translation of claim 2, wherein said TM-expanded form is an expanded TM obtained by applying said TM expansion rule reflecting ellipsis of particles to the result of morphemic analysis of a source sentence so that ellipsis of particles is taken into account.

4. The TM application method for automatic translation of claim 2, wherein said TM-expanded form is an expanded TM obtained by applying said TM expansion rule reflecting inflection to the result of morphemic analysis of a source sentence so that an interrogative form is registered in lieu of individual endings to treat them as an identical TM.

5. The TM application method for automatic translation of claim 2, wherein said TM-expanded form is an expanded TM obtained by applying said TM expansion rule reflecting free word order to the result of morphemic analysis of a source sentence so that said sentence is recomposed in clauses by a criterion independent of word order.

6. The TM application method for automatic translation of claim 2, wherein said TM-expanded form is an expanded TM obtained by applying said TM expansion rule reflecting paraphrase with various expressions to the result of morphemic analysis of a source sentence so that paraphrase data stored in paraphrase database are applied.

7. The TM application method for automatic translation of claim 6, wherein said paraphrase data are in one form of a word, a clause or a sentence.

8. The TM application method for automatic translation of claim 2, wherein said TM-expanded form is an expanded TM obtained by applying said TM expansion rule reflecting characteristics of a sentence-initial word to the result of morphemic analysis of a source sentence so that identified patterns of said sentence-initial word are applied for expansion.

9. The TM application method for automatic translation of claim 1, wherein said TM application method further comprises producing, if said input sentence matches one of said source sentences stored in said basic TM database, a translated output corresponding to said matched source sentence.

10. The TM application method for automatic translation of claim 1, wherein said TM application method further comprises applying a translation engine to said TM-expanded input sentence to produce an automatically translated output if said generated TM-expanded input sentence does not match any of expanded source sentences stored in said expanded TM database.

11. A translation-memory (hereinafter, referred to as TM) application apparatus for automatic translation, comprising:
    a basic TM match unit that matches an input sentence with source sentences stored in a basic TM database;
    a morphemic analyzer that analyzes morphemes of said input sentence if said basic match yields a mismatch;
    an expansion unit that generates a TM-expanded form by applying pertinent ones among TM expansion rules to said input sentence whose morphemes have been analyzed; and
    an expanded TM match unit that produces a translated output corresponding to said matched expanded source sentence if said generated TM-expanded input sentence matches one of expanded source sentences stored in an expanded TM database.

12. The TM application apparatus for automatic translation of claim 11, wherein said basic TM match unit produces, if said input sentence matches one of source sentences stored in said basic TM database, a translated output corresponding to said matched source sentence.

13. The TM application apparatus for automatic translation of claim 11, wherein said expansion unit further includes:
   a TM expansion-rule holder that holds said TM expansion rules;
   a paraphrase database that stores paraphrase data; and
   an expansion module that applies said paraphrase data to source sentences whose morphemes have been analyzed, generates TM-expanded source sentences by applying said TM expansion rules to said source sentences, respectively, and stores translated sentences corresponding to said generated TM-expanded source sentences in said expanded TM database.

14. The TM application apparatus for automatic translation of claim 13, wherein said TM expansion rules further have:
   a TM expansion rule reflecting ellipsis;
   a TM expansion rule reflecting inflection;
   a TM expansion rule reflecting free word order;
   a TM expansion rule reflecting paraphrase with various expressions; and
   a TM expansion rule reflecting characteristics of a sentence-initial word.

15. The TM application apparatus for automatic translation of claim 14, wherein said TM-expanded form is an expanded TM obtained by applying said TM expansion rule reflecting ellipsis of particles to the result of morphemic analysis of a source sentence so that ellipsis of particles is taken into account.

16. The TM application apparatus for automatic translation of claim 14, wherein said TM-expanded form is an expanded TM obtained by applying said TM expansion rule reflecting inflection to the result of morphemic analysis of a source sentence so that an interrogative form is registered in lieu of individual endings to treat them as an identical TM.

17. The TM application apparatus for automatic translation of claim 14, wherein said TM-expanded form is an expanded TM obtained by applying said TM expansion rule reflecting free word order to the result of morphemic analysis of a source sentence so that said sentence is recomposed in clauses by a criterion independent of word order.

18. The TM application apparatus for automatic translation of claim 14, wherein said TM-expanded form is an expanded TM obtained by applying said TM expansion rule reflecting paraphrase with various expressions to the result of morphemic analysis of a source sentence so that paraphrase data stored in paraphrase database are applied.

19. The TM application apparatus for automatic translation of claim 14, wherein said TM-expanded form is an expanded TM obtained by applying said TM expansion rule reflecting characteristics of a sentence-initial word to the result of morphemic analysis of a source sentence so that identified patterns of said sentence-initial word are applied for expansion.

20. The TM application apparatus for automatic translation of claim 11, wherein said TM application apparatus further comprises a translation engine that produces an automatically translated output of said TM-expanded input sentence if said generated TM-expanded input sentence does not match any of expanded source sentences stored in said expanded TM database.

* * * * *